United States Patent [19]

Van Der Plas et al.

[11] Patent Number: 5,353,285
[45] Date of Patent: Oct. 4, 1994

[54] TIME SLOT MANAGEMENT SYSTEM

[75] Inventors: Gert Van Der Plas, Merchtem;
Willem J. Verbiest, Sint Gillis Waas;
Denis J. Mestdagh, Brussels;
Christiaan H. Sierens, Kontich, all of Belgium

[73] Assignee: Alcatel N.V., Rijswijk, Netherlands

[21] Appl. No.: 983,876

[22] Filed: Dec. 1, 1992

[30] Foreign Application Priority Data

Dec. 5, 1991 [EP] European Pat. Off. ........ 91870197.0

[51] Int. Cl.$^5$ ............................................... H04J 3/16
[52] U.S. Cl. ................................... 370/84; 370/85.7; 370/95.3
[58] Field of Search ............. 370/79, 82, 84, 85.1, 370/85.7, 85.8, 94.1, 94.2, 95.1, 95.3; 359/118, 135

[56] References Cited

U.S. PATENT DOCUMENTS

| | | | |
|---|---|---|---|
| 5,081,623 | 1/1992 | Ainscow | 370/85.7 |
| 5,179,556 | 1/1993 | Turner | 370/84 |
| 5,208,808 | 5/1993 | D'Ignazio et al. | 370/85.7 |
| 5,214,645 | 5/1993 | Hagirahim | 370/94.1 |

FOREIGN PATENT DOCUMENTS

| | | |
|---|---|---|
| 0318332 | 5/1989 | European Pat. Off. . |
| 0337619 | 10/1989 | European Pat. Off. . |
| 0348095 | 12/1989 | European Pat. Off. . |
| 0437072 | 7/1991 | European Pat. Off. . |

OTHER PUBLICATIONS

"Passive Optical Network for Realtime Use" by J. Tatsuo Koji et al, Proceedings of Globecom '85–New York, pp. 1037–1041. Globecom '85 IEEE Telecommunication Conference.

British Telecom Tecnical Journal, vol. 7, No. 2, Apr. 1989, London, DE; pp. 100–114; Hoppitt et al.: 'The Provision of Telephony Over Passive Optical Networks' p. 108, paragraph 5.5.

International Conference on Integrated Broadband Services and Networks 1990; 15–18, Oct. 1990, London UK, pp. 58–62, J. W. Ballance et al.; 'Access Networks-Beyond MANS to Solutions compatible with B-I-SON' pp. 59–61.

IEEE Journal on Selected Areas in Communication, vol. 6, No. 9, Dec. 1988, New York US, pp. 1545–1555; J. P. Vorstermans et al, 'Layered ATM Systems and Architectural Concepts for Subscribers Premises Networks'.

*Primary Examiner*—Benedict V. Safourek
*Attorney, Agent, or Firm*—Ware, Fressola, Van Der Sluys & Adolphson

[57] ABSTRACT

The time slot management system is included in a digital time division multiple access system includes a main station MS and a plurality of substations U1/16 connected to each other via a tree network. The substations U1/16 send to the main station MS upstream information packets in time slots assigned to each of the former stations by the main station. Part of the time slots are reserved for management information and used by the substation to inform the main station about the bandwidth needed for the further transfer of the upstream information, According to this information the time slot management system allocates the time slots and informs the substations thereof. In this way a flexible and dynamic time slot allocation is provided.

11 Claims, 2 Drawing Sheets

TIME SLOT MANAGEMENT SYSTEM

TECHNICAL FIELD

The present invention relates to a time slot management system for a digital time division multiple access system including a main station coupled to each of a plurality of substations via the cascade connection of a common transmission link and an individual user link, said management system being able to allow each of said substations to transfer upstream information packets to said main station in time slots.

BACKGROUND OF THE INVENTION

Such a management system is already known in the art, e.g. from the article "Passive optical network for realtime use" by J. Tatsuo Koji et al, Proceedings of Globecom '85—New York, pp. 1,037–1,041. Therein a functional description is given of a management system controlling the transfer of information packets in a star network in which a plurality of user stations are connected via user links to a central star node. One of the user stations operates as main station, called Present Supervisory Control (PSVC) station and its link to the central star node may be considered as the above common link. The time slots used for upstream communication are allocated in a fixed way, i.e. without taking into account possible changes in the bandwidth required by the substations to send the upstream packets. Indeed, the main user station PSVC is able to send to the other user stations a frame header packet with time slots assigned to the latter stations and each of them detects the assigned time slot by counting the time slots until the counted number reaches its own previously assigned number. It should be noted that in the above star network information packets are transferred not only between the user stations and the main station, but also between the user stations themselves.

SUMMARY OF THE INVENTION

An object of the invention is to provide a management system of the above type but which assigns the mentioned time slots in a flexible way, i.e. which takes into account the above mentioned changes.

This object is achieved by means of a management system of the above type but wherein part of said time slots are dedicated for upstream transfer, from said user stations to said main station, of information concerning the bandwidths required for further transfer of upstream information packets by these stations, said time slot management system including a registration means to store for said user stations values indicative of said bandwidths and a conversion and transmission means to convert said values to corresponding occurrences of identities in a stream of station identities and to transmit said stream of identities in downstream information packets to said user stations, each of which upon detection of its own identity in said stream being allowed to transfer a predetermined amount of upstream information packets.

In this way the time slots in which each user station can send upstream information packets are determined by the transferred stream of station identities and the stream of station identities is derived from the stored bandwidth values which are regularly adapted according to the bandwidth information sent from the user stations to the main station by means of the reserved time slots, each of these values being converted in a corresponding number of time slots. As a consequence, the mentioned time slots are allocated in a flexible way with respect to the bandwidth required for the transfer of the upstream information packets.

A feature of the invention is that said downstream information packets include a predetermined number of blocks each of which includes a header part and an information part, the identities of said stream being distributed over the header parts of said blocks and that each of said header parts is 1 byte long, whilst said predetermined number equals 4, synchronization information, the identity of 4 user stations and error check information being distributed over the 4 headers of each of said downstream information packets, which implies a packet overhead of 4 bytes for 4 ATM cells. Since each ATM cell contains 53 bytes, this means an overhead of above 2% where it can be calculated that the existing system works with a package or frame overhead of about 7%. In the known system, which has a data rate of 32 Mbit/s, the maximum frame time is about 70 ms whilst 127 stations transmit 2,048 byte data packets, which corresponds to a time of 65 ms, i.e. an overhead of 5 ms for 70 ms or 7%. Moreover this overhead increases with the distance between the user stations due to the use of slot intervals.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
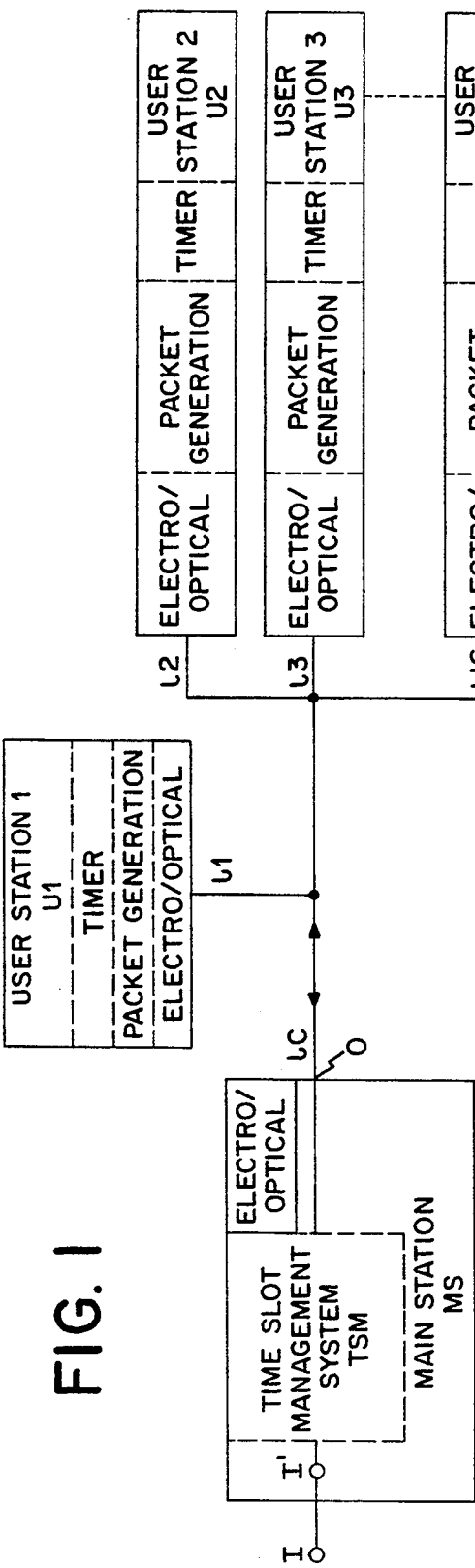
FIG. 1 represents a communication system using a time slot management system (TSM) according to the invention.

The present time slot management system (TSM) is part of a communication system which is shown in FIG. 1 and which is a point-to-multipoint system. This system is able to transmit packets containing Asynchronous Transfer Node (ATM) cells at a rate of 155.52 Mbit/s, and comprises a main station MS that is connected to 16 user stations U1/16 via the cascade connection of an optical fiber common link Lc, and respective individual user optical fibre links L1 to L16. The main station and each user station therefore includes an electro/optical interface for transmitting and receiving information on these fibre links, with each station having a packet generation module for generating upstream data packets.

The main station MS has an input terminal I to which is connected an (not shown) interworking unit providing for instance an interface to a local exchange. MS also has an output terminal O connected to the common link Lc.

The packets with ATM cells are transmitted in time slots from the user stations U1/16 to the main station MS, i.e. in upstream direction, and vice versa, i.e. in downstream direction. The main station MS, and more specifically the time slot management system TSM included therein, controls the upstream communication in a flexible way by dynamically assigning time slots to each of the user stations U1/16 to enable them to transfer upstream information packets.

Figure 2:
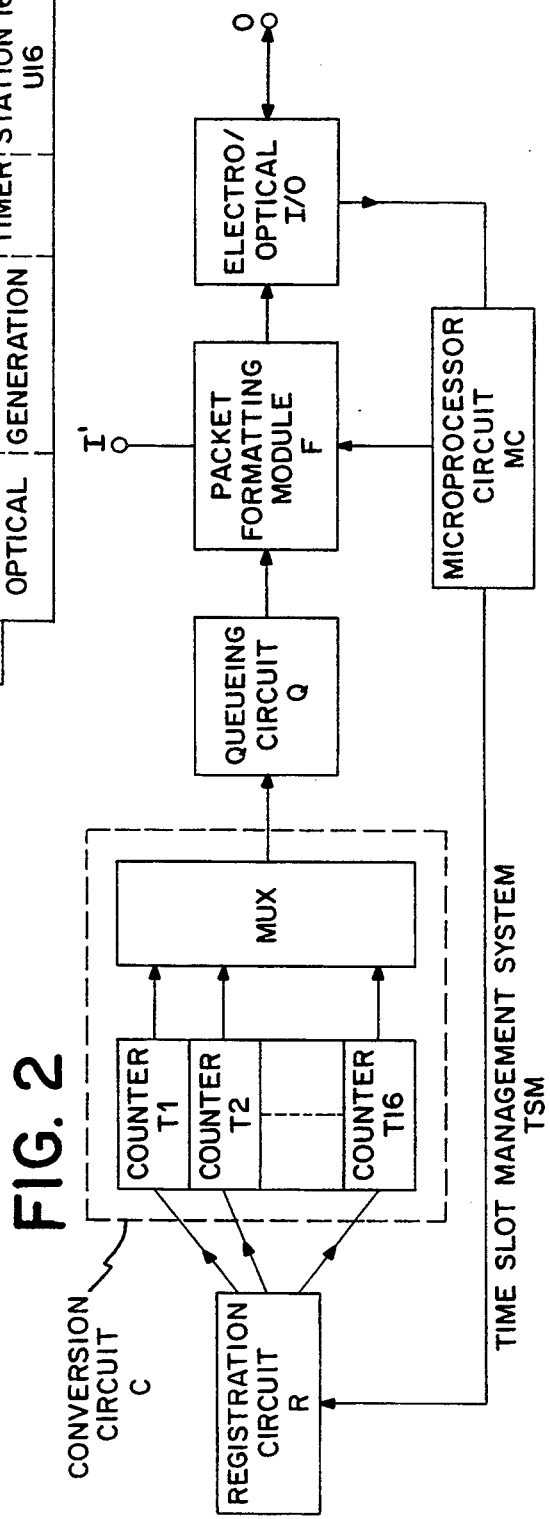
FIG. 2 is a schematic representation of the time slot management system (TSM) of FIG. 1.

TSM, of which a schematic and functional diagram is shown in FIG. 2, includes a registration circuit R which is able to store values indicative of information concerning the bandwidth, required by the user stations for upstream communication and extracted from management packets sent by these user stations U1/16 to the main station MS. How this is achieved will be explained later. R has an input to which an output of an input/output module I/O is connected via a microprocessor circuit MC, and 16 control outputs each of which is coupled to a respective one of 16 cyclic counter circuits T1/16 forming part of a conversion circuit C. An output of each of these counter circuits T1/16 is connected to a respective input of a multiplexer circuit MUX also included in C. An output of MUX is via a first-in-first-out FIFO queueing circuit Q coupled to a packet formatting module F which performs the encapsulation of the ATM cells to be sent to the user stations, in the downstream packets. F has a second input I' at which the latter cells are applied, a third input to which the microprocessor circuit MC is connected and an output coupled to the output terminal O of the main station MS via the input/output circuit I/O.

The following is with reference to FIGS. 1 and 2 and is a description of the working of the time slot management circuit TSM.

The microprocessor circuit MC periodically applies command signals to the packet formatting module F which in response to each such signal generates a downstream packet with a management ATM cell and transmits this packet to the user stations U1/16. This downstream packet contains the identity of a user station for which the management ATM cell is intended. Upon receipt of such a management cell and detection of its identity, a user station via a packet generation module, is allowed to send in a following time slot the peak rate at which it intends to perform upstream packet transfer, i.e. a value indicative of the bandwidth required for this transfer. The downstream packets will be described in more detail later. A timer may be associated with each user station wherein each timer relates to a predetermined time interval, and wherein each timer begins to transmit upon the station identity being detected in a downstream data packet, so that upon the expiration of the timer, the user station generates an upstream packet.

When the packet rate information is received by I/O, it is transmitted to the microprocessor circuit MC which extracts from it the packet rate and transmits this information to the registration circuit R wherein it is converted and stored, the converted value being the inverse of the rate i.e. the period between 2 consecutive upstream packets, thereby possibly overwriting a previously stored value, This above period is expressed in time units provided by a packet clock (not shown) in the main station, It should be noted that the user station can also send the inverse of the required bandwidth to the main station, in which case that information is stored by R as such.

Each of the cyclic counter circuits T1/16 is associated with a corresponding one of the user stations U1/16, e.g. T1 is associated to U1, T2 to U2, etc., and has an identity which corresponds to the identity of the user station to which it is associated. Starting from a maximum value the cyclic counters T1/16 count down and generate a zero indication trigger signal when reaching zero, whereafter the count is restarted. The maximum value is the period value stored in the registration circuit R for the associated user station. The latter circuit R presets the counters T1/16 to their corresponding maximum value, i.e. the corresponding stored value, each time the latter value is adapted. The counters count down at the rate of the above packet clock in the main station MS. This clock is extracted in the user stations U1/16 from the information packets sent thereto by the main station and is used as a local clock. In this way the peak rate information sent to the main station can be expressed in the same time unity as provided by the packet clock and consequently each counter circuit counts the number of time units in a period; i.e. the time elapsing between the requested sending of two consecutive packets by the associated user station, The multiplexing circuit MUX successively scans the outputs of the counter circuits T1/16 and generates at its output a signal indicative of the identity of a scanned counter only when it detects the above trigger signal.

The scanning of all counter outputs is realized within 1 upstream packet period to avoid a zero indicating trigger signal provided by one of the counters T1/16 that overwrites a previous one before the latter is detected by the multiplexing circuit MUX. A latching circuit (not shown) ensures that the zero indicating signal remains at the corresponding output during the latter packet period.

The thus generated identities are stored in the FIFO queue Q from where the first four are retrieved periodically, at the rate of the downstream transfer, by the packet formatting module F which inserts them in a downstream information packet. In case there are less than identities available in the FIFO queue Q, dummy or zero identities are used to complete the set of 4 identities.

It has to be noted that the conversion circuit can also be realized by means of a software program and a processing unit or by hardware arithmetic implementations.

Figure 3:
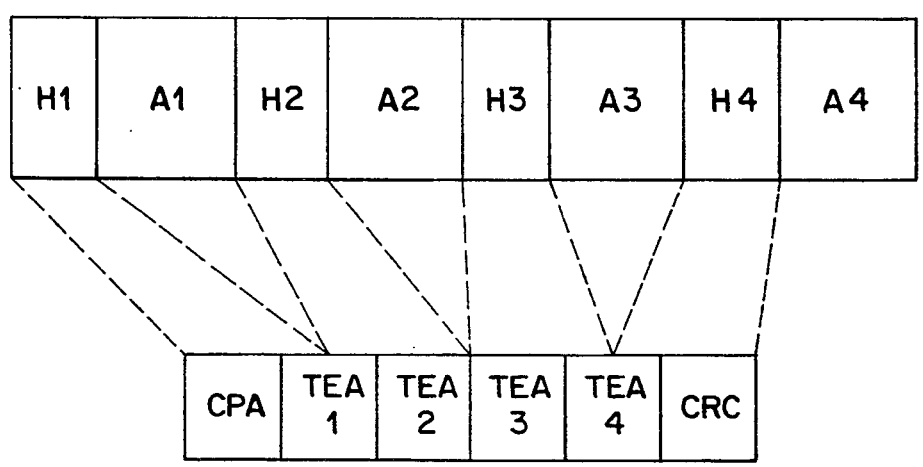
FIG. 3 represents the contents of a downstream information packet transferred by the communication system of FIG. 1.

FIG. 3 represents the mentioned downstream information packet. It consists of 4 blocks each having a header part $H_i^1$ and a respective information part $A_i^1$ containing an ATM cell. The four identities, $TEA_i^1$, also called Transmit Enable Addresses, which are user station identities, retrieved from Q or null-identities, are distributed over the 4 header parts H1 to H4 together with synchronization information CPA and error check information CRC as shown in FIG. 3. CPA which is 3 bits long and the first 5 bits of TEA1 (where TEA in total is 6 bits long), are stored in H1; the last bit of TEA1, TEA2 and the first bit of TEA3 are stored in H2; the last 5 bits of TEA3 and the first 3 bits of TEA4 are stored in H3 and the last 3 bits of TEA4 and CRC form H4.

The 4 ATM cells stored in A1 to A4 are provided at the input I' of F or provided by the microprocessor circuit HC in case the earlier mentioned management cells have to be transmitted and they are destined to the user station having the identity $TEA_i^1$ respectively, The cells provided at I' are extracted from a signal provided by the earlier mentioned interworking unit at the input I of the main station. Since this extraction is not relevant for the invention it is not described in detail, nor are the functional blocks required therefore represented in FIG. 1. An indication of their presence is given by the dotted line between I and I'.

The distinction between an information packet containing a management ATM cell and the one containing an ATM cell provided at I' is made by a dedicated address field, more specifically a VP/VC field, in the header of a dedicated address field, the ATM cell which is contained in the information part $A_1^i$. The management packets are under control of the microprocessor MC transferred periodically at a rate of 1 every 53 ATM cells.

The downstream packet generated by F as described above is provided at the output O via the input/output device I/O and is transferred to the user stations U1/16, where each station, based on the identity $TEA_1^4$ included in the packet extracts from it the information intended for itself and derives from that information the instant at which an upstream packet may be sent to the main station MS. For instance, if TEA2 is the identity of U5, then U5 may send an upstream packet after receipt of the complete downstream packet containing TEA2. A user station detecting its identity in a received packet, has, when sending an upstream packet, to take into account its equalization delay plus n times an upstream packet period where n equals 0,1, 2 or 3 according to the user station's identity being respectively equal to TEA1, TEA2, TEA3 or TEA4. This to avoid collision on the common link Lc with an upstream packet sent by any of the three other user stations of which the identity is included in the same received packet. In the above example U5 waits, after receipt of the downstream packet including its identity, for its equalization delay plus 1 upstream packet period before sending an upstream packet. How the equalization delay is determined is for instance described in U.S. application Ser. No. 893,210, filed Jun. 2, 1992, entitled "Method for Determining Equalization Delays in a Transmission System and Related Transmission System", assigned to the present assignee, which is hereby incorporated by reference.

At start up of a new user station, the equalization delay thereof is determined for the first time by means of a ranging procedure described in the above patent application. When the latter procedure is completed the main station allocates a station identity to the new station and informs it thereof via a signal similar to the ranging signal used in this procedure. From that moment on the new user station is able to extract from the downstream packets, ATM cells destined to it. The first cell sent to the new user station by the main station is a management cell, thereby enabling the latter user station to inform the main station about its peak transmission rate.

It has to be noted that if either the main station MS or the user stations U1/16 have no ATM cells to transfer, they insert an idle cell in the downstream and upstream packets respectively.

The implementation of the blocks of the time slot management system described above are either readily realizable for a person skilled in the art or are generally known in the art and are therefore not described in detail.

While the principles of the invention have been described above in connection with specific apparatus, it is to be clearly understood that this description is made only by way of example and not as a limitation on the scope of the invention.

We claim:

1. A time slot management system for a digital time division multiple access system including a main station (MS) coupled to each of a plurality of user stations (U1/16) via the cascade connection of a common transmission link (Lc) and an individual user link (L1/16) with respect to the corresponding user stations (U1, U2, . . . , U16), said management system having means for allowing each of said user stations (U1/16) to transfer upstream information packets to said main station (MS) in time slots, the main station having means for associating a current bandwidth with each user station with respect to that user station sending upstream information packets, characterized by means for generating upstream information packets in said user stations (U1/16) to said main station (MS), including information concerning the desired bandwidths required for further transfer of upstream information packets by these stations at least when said bandwidths required are different from the main station respective current bandwidths, said time slot management system including a registration means (R) to store said user stations (U1/16) information indicative of each user station's desired bandwidth and a conversion and transmission means (C) to repetitively convert said user stations (U1/16) information to corresponding occurrences of identities constituting grant signals for the user stations having these identities in a stream of station identities, and packet processing means (I/O) to transmit said stream of identities in downstream information packets to said user stations (U1/16), each user station (U1/16) having means for detecting its own identity in said stream and for transferring a predetermined amount of upstream information packets upon detecting its own identity.

2. A time slot management system according to claim 1, characterized in that each of said user stations (U1/16) includes timer means to indicate a predetermined time interval after detecting its identity, said user station transferring means transferring said upstream information packets when said time interval has elapsed.

3. A time slot management system according to claim 1, characterized in that said time slot management system is located in said main station (MS).

4. A time slot management system according to claim 1, characterized in that said conversion and transmission means (C) includes:
a plurality of counter means (T1/16) each of which is dedicated to one of said user stations (U1/16) and has an identity indicative of the identity of said user station, said counter means (T1/16) each having an output at which, under control of said registration means (R), a trigger signal is generated when the identity of said user station has to be transmitted to it; and
a multiplexing means (MUX) to successively scan said outputs and when said trigger signal is present at said scanned output, to operate said packet processing means (I/O) to include in said stream the identity of the counter means corresponding to said output.

5. A time slot management system according to claim 4, characterized in that each of said plurality of counter means (T1/16) includes a counter circuit which is controlled by said registration means to count down starting from a maximum value based on said stored value and to generate said trigger signal when a predetermined minimum value is reached.

6. A time slot management system according to claim 4, characterized in that each of said plurality of counter means (T1/16) includes a counter circuit which is controlled by said registration means to count upwards from a zero value to said maximum value and to generate said trigger signal when said maximum value is reached.

7. A time slot management system according to claim 1, characterized in that said time slot management system includes a packet formatting means (F) coupled between said conversion and transmission means (C) and said packet processing means (I/O), said packet formatting means having means for inserting in said downstream information packets a predetermined number of blocks each of which includes a header part ($H\frac{i}{4}$) and an information part ($A\frac{i}{4}$), the identities of said stations being distributed over the header parts of said blocks.

8. A time slot management system according to claim 7, characterized in that said packet processing means includes:

a queuing means (Q) to queue said stream of identities; and a packet formatting means (F) to distribute a plurality of said identities, after retrieval from said queuing means, over said header parts ($H\frac{i}{4}$), said plurality corresponding to said predetermined number of blocks.

9. A time slot management system according to claim 7, characterized in that each of said header parts ($H\frac{i}{4}$) is 1 byte long, whilst said predetermined number of blocks equals 4, and where synchronization information (CPA), the identity of 4 user stations ($TEA\frac{i}{4}$) and error check information (CRC) is distributed over the 4 headers of each of said downstream information packets.

10. A time slot management system according to claim 7, characterized in that each of said upstream information packets and each of said information parts ($A\frac{i}{4}$) includes at least one Asynchronous Transfer Mode cell.

11. A time slot management system according to claim 1, characterized in that said digital time division multiple access system common transmission link (Lc) and the individual user links (L1/16) comprise optical fiber.

* * * * *